United States Patent
Han-Adebekun et al.

(10) Patent No.: US 6,666,553 B2
(45) Date of Patent: Dec. 23, 2003

(54) METHOD OF SELECTING INK JET INKS IN A COLOR SET

(75) Inventors: Gang C. Han-Adebekun, Rochester, NY (US); Huijuan D. Chen, Webster, NY (US); James A. Reczek, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/034,285

(22) Filed: Dec. 28, 2001

(65) Prior Publication Data

US 2003/0128263 A1 Jul. 10, 2003

(51) Int. Cl.$^7$ .............................. B41J 2/01; G01D 11/00; C09D 11/00
(52) U.S. Cl. .................... 347/101; 347/100; 106/31.13; 106/31.6
(58) Field of Search ............................ 347/96, 19, 100, 347/101, 105; 106/31.6, 31.13

(56) References Cited

U.S. PATENT DOCUMENTS

| | | | |
|---|---|---|---|
| 4,597,794 A | | 7/1986 | Ohta et al. |
| 5,026,427 A | | 6/1991 | Mitchell et al. |
| 5,085,698 A | | 2/1992 | Ma et al. |
| 5,086,698 A | | 2/1992 | Wirz |
| 5,141,556 A | | 8/1992 | Matrick |
| 5,160,370 A | | 11/1992 | Suga et al. |
| 5,169,436 A | | 12/1992 | Matrick |
| 5,172,133 A | | 12/1992 | Suga et al. |
| 5,738,716 A | * | 4/1998 | Santilli et al. ............... 347/100 |
| 6,011,098 A | * | 1/2000 | Kashiwazaki et al. ...... 524/377 |
| 6,096,463 A | * | 8/2000 | Hamano et al. ............... 430/47 |
| 6,244,701 B1 | * | 6/2001 | Moriya et al. ............... 347/105 |
| 6,268,101 B1 | | 7/2001 | Yacobucci et al. |
| 6,436,515 B1 | * | 8/2002 | Ohbayashi et al. ......... 428/195 |

FOREIGN PATENT DOCUMENTS

| | | |
|---|---|---|
| EP | 1 048 466 A2 | 11/2000 |
| EP | 1 057 646 A2 | 12/2000 |

OTHER PUBLICATIONS

Chen, et al., Ink Jet Ink Set, USSN 10/034,721 filed Dec. 28, 2001.
Reczek et al., Ink Jet Ink Set/Receiver Combination, USSN 10/033,229 filed Dec. 28, 2001.
Han–Adebekun, et al., A Method of Selecting Ink Jet Inks and Receiver in a Color Set and Receiver Combination, USSN 10/032,931 filed Dec. 28, 2001.

Chen et al., Materials for Reducing Inter–Color Gloss Difference, USSN 10/034,281 filed Dec. 28, 2001.

Wexler, Ink Jet Printing Method, USSN 09/954,779 filed Sep. 13, 2001.

\* cited by examiner

*Primary Examiner*—Stephen D. Meier
*Assistant Examiner*—An H. Do
(74) *Attorney, Agent, or Firm*—Doreen M. Wells

(57) ABSTRACT

A method of selecting inks within an inkjet ink set for color printing includes: a) providing at least two color inks, each ink having a carrier and a pigment; b) printing the above inks onto a receiver using test images consisting of single color patches of a Dmax density (100% dot coverage); c) measuring the gloss level of each patch at a predefined specular angle; d) calculating the Relative Gloss Variability (RGV) values of the ink set based on the definition in Equation A; and e) selecting inks for the color set such that the Relative Gloss Variability (RGV) among inks is less than 10% when 60° is used as the specular angle:

$$RGV(\%) = \frac{\sum_{I=1}^{N} |(\text{Gloss(Imaged Area)}_I - AG)|}{AG} \bigg/ N \quad \text{Equation (A)}$$

Where $$AG = \frac{\sum_{I=1}^{N} \text{Gloss(Imaged Area)}_I}{N}$$

I is a variable which identifies a certain color patch used in the evaluation,

N is the total number of color patches used in the evaluation.

20 Claims, No Drawings

METHOD OF SELECTING INK JET INKS IN A COLOR SET

CROSS REFERENCE TO RELATED APPLICATIONS

This application relates to commonly assigned application Ser. No. 10/033,229 entitled INK JET INK SET/RECEIVER COMBINATION; application Ser. No. 10/034,721 entitled INK JET INK SET; application Ser. No. 10/032,931 entitled A METHOD OF SELECTING INK JET INKS IN A COLOR SET and application Ser. No. 10/034,281 entitled INK JET INK SET/RECEIVER COMBINATION filed simultaneously herewith. These applications are incorporated by reference herein for all that they contain.

FIELD OF THE INVENTION

This invention relates to a method of selecting ink jet inks in a color set that provide images with improved inter-color gloss differences.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation.

The inks used in the various ink jet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

Although there have been many recent advances in the art of dye-based ink jet inks, such inks still suffer from major deficiencies such as poor image stability against light and gases commonly contained in the air, such as ozone (O3), nitrogen oxide (NOx) and sulfur oxide (SOx), especially on receivers having porous ink receiving layers. One method of addressing these limitations is to use pigment-based inks. When designed properly, pigment based inks usually can demonstrate image stability significantly higher than the dye based inks, and more importantly, approaching the archival quality as compared to silver halide photographic prints.

A major image quality drawback of pigment-based inks is "inter-color differential gloss", where the gloss levels of imaged areas of different colors are very different from each other. This type of image quality defect can be quite noticeable, even to ordinary observers. One possible solution to this problem is to cover the entire receiver with a protective layer through techniques such as laminating the printed image, or fusing the top fusible polymeric layer in receivers to a continuous overcoat layer, such as those disclosed in U.S. patent application, Ser. No. 09/954,779, filed on Sep. 18, 2001 of Wexler, or coating a protective layer on the imaged areas as described in EP1057646 and EP1048466. However, all these approaches involve separate steps after printing, making the entire process complex and costly.

What the art needs is a way to minimize gloss level variations among different colors in a color image when the various inks are deposited and dried on a receiver. This should be done as part of the printing process and not as a separate step after printing.

SUMMARY OF THE INVENTION

The present invention provides a method for selecting inks in a color set so that the ink set is capable of producing images wherein the gloss level variations among different colors in the color image is minimized. The gloss variation is judged after the ink is deposited and dried on a receiver, but the invention is a part of the ink selection and printing process; not a separate step after printing.

In accordance with the invention, the gloss level of each ink is predetermined, as measured from single color patches on a receiver, and the gloss level variability among different inks is calculated. By keeping the gloss variability with a certain range, the quality of the image is improved.

Hence, the present invention discloses a method of selecting inks within an inkjet ink set for color printing comprises:

a) providing at least two color inks, each ink comprising a carrier and a pigment;

b) printing the above inks onto a receiver using test images consisting of single color patches of a Dmax density (100% dot coverage);

c) measuring the gloss level of each patch at a predefined specular angle;

d) calculating the Relative Gloss Variability (RGV) values of the ink set based on the definition in Equation A; and e) selecting inks for the color set such that the Relative Gloss Variability (RGV) among inks is less than 10% when 60° is used as the specular angle:

$$RGV(\%) = \frac{\sum_{I=1}^{N} |(\text{Gloss(Imaged Area)}_I - AG)|}{AG} \Big/ N \quad \text{Equation (A)}$$

Where $$AG = \frac{\sum_{I=1}^{N} \text{Gloss(Imaged Area)}_I}{N}$$

I is a variable which identifies a certain color patch used in the evaluation,

N is the total number of color patches used in the evaluation

Another embodiment of the invention discloses a method of selecting inks within an inkjet ink set for color printing comprises:

a) providing at least two color inks, each ink comprising a carrier and a pigment;

b) adjusting the sizes of the pigment particle of the inks to achieve the desired gloss;

c) printing the above inks onto a receiver using test images; consisting of single color patches of a Dmax density (100% dot coverage);

d) measuring the gloss level of each patch at a predefined specular angle; and e) selecting inks for the color set such that the Relative Gloss Variability (RGV) (Equation A) among inks is less than 10% when 60° is used as the specular angle.

Yet, another embodiment of the invention discloses a method of selecting inks within an inkjet ink set for color printing comprises:

a) providing at least two color inks, each ink comprising a carrier and a pigment;

b) adding into inks non-film forming particles with particle sizes selected to achieve the desired gloss;

c) printing the above inks onto a receiver using test images; consisting of single color patches of a Dmax density (100% dot coverage);

d) measuring the gloss level of each patch at a predefined specular angle; and e) selecting inks for the color set such that the Relative Gloss Variability (RGV) (Equation A) among inks is less than 10% when 60° is used as the specular angle.

The advantage of the invention is that it minimizes gloss difference among the different colors in a printed color image and this is done as a part of the initial printing process.

DETAILED DESCRIPTION OF THE INVENTION

Gloss Definition

Gloss, commonly referred to as specular gloss, of a surface is defined as its degree of approach to a mirror-like surface. It is a measure of the amount of energy reflected at a reflection angle equal to or near the angle of incidence. Specular gloss can be measured in terms of gloss units (gu), at several angles, e.g. 20°, 30°, 45°, 60°, 75° and 80° from the surface normal. Gloss meters are used to measure the gloss of a sample at various angles. The BYK-Gardner micro-TRI-glossmeter is an example of such an instrument. The particular instrument used in the present invention is capable of measuring gloss at three angles, 20°, 60° and 85°.

Both ink and receiver play an important role in the gloss levels of an ink jet printed image. The gloss levels of a receiver can be influenced by the receiver design, for example, the size of particles in the surface coating material and the surface roughness of the coated paper support. On the other hand, ink factors also contribute; for example, the refractive index of polymers in the inks, the film forming property of the polymers in the inks after printing, and the ink load deposit on the receiver all influence the gloss of a printed image. For particle-containing inks, such as pigment-based inks, particle size and distribution in particular have a significant impact on the gloss levels.

When an image is created by using many colors and the colors vary widely in their levels of gloss, the observed image quality can be significantly impaired. One way to quantify this inter-color gloss difference is by defining a parameter: Relative Gloss Variability (RGV), which is derived from Average Gloss (AG) as defined below:

$$RGV(\%) = \frac{\sum_{I=1}^{N} |(Gloss(Imaged\ Area)_I - AG)|}{AG} \bigg/ N \quad \text{Equation (A)}$$

Where $$AG = \frac{\sum_{I=1}^{N} Gloss(Imaged\ Area)_I}{N}$$

I is a variable which identifies a certain color patch used in the evaluation,

N is the total number of color patches used in the evaluation.

Corresponding to the above parameters is a test and printing method as described below: load the selected color ink sets into a printer and print onto a receiver using a test image. The test image is designed to consist of single color patches of Dmax density (100% dot coverage). The size of the patch needs to be large enough, for example, approximately 3 by 3 centimeters in size for uniform gloss measurement. The dot coverage is also important in order to minimize the gloss contribution from bare receiver resulted from the non-ink coverage at the pixel level. Usually, a reflection density of 1.5 (Dmax) can be achieved at 100% dot coverage. The color used in the evaluation may include any combination of colors capable of being generated by the selected ink set, such as primary colors (for example, cyan, magenta, yellow, black) or, optional secondary colors (for example, red, green, blue), process black (a combination of cyan, magenta and yellow) or 400% black (a combination of cyan, magenta, yellow and black). After allowing the printed test images to dry for 24 hours at ambient temperature and humidity, the gloss level at a certain specular angle (for example, 60 degree) of each color patch is then measured, using a gloss meter, for example, the BYK-Gardner micro-TRI-glossmeter.

Pigment Milling and Ink Formulation

The process of preparing inks from pigments commonly involves two steps: (a) a dispersing or milling step to break up the pigment to the primary particle, and (b) a dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials that may be used as milling media, such as glasses, ceramics, metals, and plastics. In a preferred embodiment, the grinding media can comprise particles, preferably substantially spherical in shape, e.g., beads, consisting essentially of a polymeric resin. In general, polymeric resins suitable for use as milling media are chemically and physically inert, substantially free of metals, solvent and monomers, and of sufficient hardness and firability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), olycarbonates, polyacetals, such as Derlin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly(hydroxyethylacrylate), silicone containing polymers such as polysiloxanes and the like. The polymer can be biodegradable. Exemplary biodegradable polymers include poly(lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly(phosphazenes). The polymeric resin can have a density from 0.9 to 3.0 g/cm3. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an air jet mill, a roller mill, a ball mill, an attritor mill and a bead mill. A high speed mill is preferred. By high speed mill we mean milling devices capable of accelerating milling media to velocities greater than about 5 meters per second. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, up on the particular material selected and the size and density of the milling media etc. After milling is complete, the dispersion of active material is separated from the grinding media by simple sieving or filtration. With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another important ingredient in the mill grind. Preferred dispersants used in the present invention include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersant to select from. The dispersant used in the examples is potassium N-methyl-N-oleoyl taurate (K-OMT).

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

The pigment particles useful in the invention may have any particle sizes than can be jetted through a print head. Preferably, the pigment particles have a mean particle size of less than about 0.5 micron.

A wide variety of organic and inorganic pigments, alone or in combination, may be selected for use in the present invention. Colorant particles which may be used in the invention include pigments as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include C.I. (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment is C.I. Pigment Blue 15:3, C.I. Pigment Red 122, C.I. Pigment Yellow 155, C.I. Pigment Yellow 74, bis(phthalocyanylalumino) tetraphenyldisiloxane or C.I. Pigment Black 7.

The pigment used in element of the invention is present in the ink jet ink in any effective amount, generally from about 0.1 to about 10% by weight, and preferably from about 0.5% to about 6% by weight.

Typically, the aqueous carrier for the ink composition is water or a mixture of water and at least one water miscible co-solvent. Selection of a suitable mixture depends on requirements of the specific application, such as desired surface tension and viscosity, the selected pigment or dye, drying time of the ink jet ink, and the type of paper onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

Typically, the amount of aqueous carrier employed is in the range of approximately 70 to 98 weight %, preferably approximately 90 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the aqueous carrier.

Other additives which may optionally be present in the ink jet ink compositions include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers. Additionally, the ink compositions can include a humectant, a surfactant, a penetrant, a biocide, etc. as is required depending on the application.

A humectant is usually employed in the ink jet compositions of the invention to help prevent the ink from drying out or crusting in the orifices of the printhead. Examples of humectants which can be used include polyhydric alcohols, such as ethylene glycol, diethylene glycol(DEG), triethylene glycol, propylene glycol, tetraethylene glycol, polyethylene glycol, glycerol, 2-methyl-2,4-pentanediol, 2-ethyl-2-hydroxymethyl-1,3-propanediol(EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether(DEGMBE), nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone, etc.

Preferred humectants for the inks of the invention include DEG, glycerol, DEGMBE, TEGMBE, 1,2-hexanediol, 1,5-pentanediol, urea, 2-pyrrolidinone, EHMP and mixtures thereof. The humectant may be employed in each ink in an amount of from about 5 to about 60 weight percent.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A penetrant (0–10% by weight) may also be added to the ink composition employed in the process of the invention to help the ink penetrate the receiving substrate, especially when the substrate is a highly sized paper. Examples of such penetrants include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol; ethers, such as tetrahydrofuran and dioxane; and esters, such as, ethyl lactate, ethylene carbonate and propylene carbonate.

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine (TEA) and tetramethylethlenediamine.

A film forming polymeric resin may be added to the ink composition, to improve the wet and dry rub resistance of the printed images. Preferably, the film forming polymeric resin is water dispersible. The polymer used in this invention are generally hydrophobic polymers of any composition that can be stabilized in a water-based medium. Such hydrophobic polymers are generally classified as either condensation polymer or addition polymers. Condensation polymers include, for example, polyesters, polyamides, polyurethanes, polyureas, polyethers, polycarbonates, polyacid anhydrides, and polymers comprising combinations of the above-mentioned types. Addition polymers are polymers formed from polymerization of vinyl-type monomers including, for example, allyl compounds, vinyl ethers, vinyl heterocyclic compounds, styrenes, olefins and halogenated olefins, ethylenically unsaturated carboxylic acids and esters derived from them, unsaturated nitriles, vinyl alcohols, acrylamides and methacrylamides, vinyl ketones, multifunctional monomers, or copolymers formed from various combinations of these monomers.

Preferred film forming polymeric resin includes those styrene/acrylic polymers prepared by free-radical polymerization of vinyl monomers in aqueous emulsion, polyester ionomers such as Eastman AQ® polyesters, (Eastman Chemical Company) including Eastman Polyesters AQ 29, AQ 38, and AQ 55, and polyurethanes, such as those disclosed in U.S. patent application, Ser. No. 09/548,514, filed Apr. 13, 2000, of Yacobucci et al., the disclosure of which is hereby incorporated by reference, Witcobond® polyurethane dispersion by Witco Corp. and Sancure® polyurethane by BF Goodrich Company.

The film forming polymeric resin used in element of the invention is present in the composition in any effective amount, generally from about 0.1 to about 10% by weight, and preferably from about 0.5% to about 5% by weight.

The ink can further comprise non film-forming particles, including polymer particles and inorganic particles such as silica, alumina, titanium dioxide, clay, calcium carbonate, barium sulfate, or zinc oxide. It is preferred that the polymer particles have a glass transition temperature greater than 60° C. More preferably, the polymer should have a glass transition temperature greater than 80° C.

The non-film forming particles used in element of the invention is present in the composition in any effective amount, generally from about 0.1 to about 10% by weight, and preferably from about 0.5% to about 5% by weight. The mean particles size of the non-film forming particles used in the invention is generally in the range of 0.01 to 1 micron, more preferably 0.03 to 0.5 micron.

Most of the ink receiving element commonly used in ink jet printing can be used in this invention. The support for the ink-receiving element employed in the invention can be paper or resin-coated paper, plastics such as a polyolefin type resin or a polyester-type resin such as poly(ethylene terephthalate), polycarbonate resins, polysulfone resins, methacrylic resins, cellophane, acetate plastics, cellulose diacetate, cellulose triacetate, vinyl chloride resins, poly(ethylene naphthalate), polyester diacetate, various glass materials, etc. or comprising an open pore structure such as those made from polyolefins or polyesters. The thickness of the support employed in the invention can be, for example, from about 12 to about 500 $\mu$m, preferably from about 75 to about 300 $\mu$m.

The ink-receiving layer employed in the invention can consist of hydrophilic polymer which is capable of absorbing and retaining an ink or can be porous layer having interconnecting voids. In a preferred embodiment, the hydrophilic polymer which may be used in the invention includes poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. Preferably, the hydrophilic polymer is poly(vinyl alcohol), hydroxypropyl cellulose, carboxymethyl cellulose, hydroxypropyl methyl cellulose, a poly(alkylene oxide), poly(vinyl pyrrolidinone), or copolymers thereof or gelatin. In another preferred embodiment, the porous ink-receiving layer may contain inorganic particles such as silica, alumina, titanium dioxide, clay, calcium carbonate, barium sulfate, or zinc oxide. In an additional preferred embodiment, the porous ink-receiving layer comprises from about 20% to about 95% inorganic particles and from about 5% to about 80% polymeric binder, such as gelatin, poly(vinyl alcohol), poly(vinyl pyrrolidinone) or poly(vinyl acetate) and copolymers thereof. The porous ink-receiving layer can also contain polymer micro-porous structures without inorganic filler particles as shown in U.S. Pat. Nos. 5,374,475 and 4,954,395.

The following example illustrates the utility of the present invention.

EXAMPLES

Preparation of Pigment Dispersion

Cyan Pigment Dispersion

The cyan pigment dispersion contains: 8000 g of Polymeric beads, mean diameter of 50 $\mu$m (milling media); 1600 g of Bridged aluminum phthalocyanine pigment (Eastman Kodak); 960 g of Oleoyl methyl taurine, (OMT) Potassium salt and 5440 g of Deionized water.

The above components were milled in a 40 liter double walled vessel obtained from BYK-Gardner using a high energy media mill manufactured by Morehouse-Cowles Hochmeyer. The mill was run for approximately 8 hours at room temperature. During the milling process, three batches of pigment samples (15.0 g each) as PC-1, PC-2, and PC-3 were obtained such that the median pigment particle sizes are about 30 nm, 100 nm and 150 nm as measured by MICROTRAC II Ultrafine particle analyzer (UPA) manufactured by Leeds & Northrup. The medium particle size represents that 50% of the volume in the sample is smaller than the indicated size. The dispersion was separated from the milling media by filtering the mill grind through a 4–8 $\mu$m KIMAX® Buchner Funnel obtained from VWR Scientific Products. Additional 8000 g of dilution water was added to the filtered dispersion followed by a biocide, Proxel® GXL (Zeneca Corp.). The pigment is about 10.0% by weight of the total final dispersion and the biocide is about 230 ppm by weight of the total final dispersion.

Yellow Pigment Dispersion

This dispersion was prepared the same as the Cyan Pigment Dispersion 1 except that Pigment Yellow 155 (Clariant Corp.) was used instead of Bridged aluminum phthalocyanine pigment. The amount of OMT Potassium salt was 25 weight % based on the pigment. During the milling process, four batches of pigment samples (15.0 g each) as PY-1, PY-2, PY-3 and PY-4 were obtained such that the median pigment particle sizes are about 40 nm, 110 nm, 130 nm and 160 nm as measured as measured by MICROTRAC II Ultrafine particle analyzer (UPA) manufactured by Leeds & Northrup.

Ink-Y1

To prepare the Ink-Y1, 2.5 g of Pigment Dispersion PY-1 (10% active), 0.05 g Surfynol® 465 (Air Products Inc.), 0.8 g glycerol, 1.0 g triethylene glycol and 0.3 g di(propyleneglycol) methyl ether (Dowanol® DPM), and 0.33 g of AQ55® (30.5% active) were added together with distilled water so that the final weight of the ink was 10.0 g. The final ink contained 2.5% Pigment Yellow 155, 0.50% Surfynol® 465, 8.0% glycerol, 10.0% triethylene glycol, 3% di(propyleneglycol) methyl ether and 1% AQ55®. The solution was filtered through a 3 $\mu$m polytetrafluoroethylene filter and filled into an empty Epson 660 ink jet cartridge.

Ink-Y1a

Ink Y1a was prepared similar to Ink-Y1 except that 0.4 g Nyacol IJ200® (50% active), a silica dispersion from Akzo-Nobel, was also added in addition to the other components so that the final ink contained 2% by weight of Nyacol IJ200®.

Ink-Y1b

Ink Y1b was prepared similar to Ink-Y1 except that 0.48 g Snowtex ST-ZL® (41.5% active), a silica dispersion from Nissan Chemical Industry, was also added in addition to the other components so that the final ink contained 2% by weight of Snowtex ST-ZL®.

Ink-Y1c

Ink Y1c was prepared similar to Ink-Y1 except that 0.5 g EF10611® (40% active), a silica dispersion from Akzo-Nobel, was also added in addition to the other components so that the final ink contains 2% by weight of EF10611®.

Ink-Y2

Ink Y2 was prepared similar to Ink-Y1 except that pigment dispersion PY-2 was used instead of pigment dispersion PY-1.

Ink-Y3

Ink Y3 was prepared similar to Ink-Y1 except that pigment dispersion PY-3 was used instead of pigment dispersion PY-1.

Ink-Y4

Ink Y4 was prepared similar to Ink-Y1 except that pigment dispersion PY-4 was used instead of pigment dispersion PY-1.

Ink-Y5

Ink Y5 was obtained from the yellow channel of Epson 2000P Color Cartridges, CAT. No. T106201. The ink was then refilled into an Epson 660 empty cartridge.

Ink-Y6

Ink Y6 was obtained from Epson C80 yellow cartridges, CAT. No. T032420. The ink was then refilled into an Epson 660 empty cartridge.

Ink-C1

Ink C1 was prepared similar to Ink-Y1 except that 2.2 g bridged aluminium phthalocyanine pigment dispersion PC-1 (10% active) was used instead of pigment dispersion PY-1. The final ink contained 2.2% by weight of bridged aluminium phthalocyanine pigment.

Ink-C1a

Ink C1a was prepared similar to Ink-C1 except that 0.4 g Nyacol IJ200® (50% active), a silica dispersion from Akzo-Nobel, was also added in addition to the other components so that the final ink contained 2% by weight of Nyacol IJ200®.

Ink-C1b

Ink C1b was prepared similar to Ink-C1 except that 0.48 g Snowtex ST-ZL® (41.5% active), a silica dispersion from Nissan Chemical Industry, was also added in addition to the other components so that the final ink contained 2% by weight of Snowtex ST-ZL®.

Ink-C1c

Ink C1c was prepared similar to Ink-C1 except that 0.5 g EF10611® (40% active), a silica dispersion from Akzo-Nobel, was also added in addition to the other components so that the final ink contained 2% weight of EF10611®.

Ink-C2

Ink C2 was prepared similar to Ink-C1 except that pigment dispersion PC-2 was used instead of pigment dispersion PC-1.

Ink-C3

Ink C3 was prepared similar to Ink-C1 except that pigment dispersion PC-3 was used instead of pigment dispersion PC-1.

Ink-C4

Ink C4 was obtained from the dark cyan channel of Epson 2000P Color Cartridges, CAT. No. T106201. The ink was then refilled into an Epson 660 empty cartridge.

Ink-C5

Ink C5 was obtained from Epson C80 cyan cartridges, CAT. No. T032220, the ink was then refilled into an Epson 660 empty cartridge.

Ink-M1

Ink M1 was obtained from the dark magenta channel of Epson 2000P Color Cartridges, CAT. No. T106201. The ink was then refilled into an Epson 660 empty cartridge.

Ink-M2

Ink M2 was obtained from Epson C80 magenta cartridges, CAT. No. T032320. The ink was then refilled into an Epson 660 empty cartridge.

Comparative Ink Set 1 (Comp-1)

Inks-C5, M2, and Y6 were used as a set of cyan, magenta, and yellow, and filled into the C, M, Y Channels of an Epson 660 empty Color cartridges, respectively.

Comparative Ink Set 2 (Comp-2)

Inks-C4, M1, Y5 were used as a set of cyan, magenta and yellow, and filled into the C, M, Y Channels of an Epson 660 empty Color cartridges, respectively.

Ink Set-1 of the Invention (I-1)

Inks-C1, M1, Y2 were used as a set of cyan, magenta and yellow, and filled into the C, M, Y Channels of an Epson 660 empty Color cartridges, respectively.

Ink Set-2 of the Invention (I-2)

Inks-C2, M2, Y3 were used as a set of cyan, magenta and yellow, and filled into the C, M, Y Channels of an Epson 660 empty Color cartridges, respectively.

Particle Size Measurement

All particles were characterized by MICROTRAC II Ultrafine particle analyzer (UPA) manufactured by Leeds & Northrup. The data reported are the size that 50% of the volume in the sample that is smaller than the indicated size, which is also known as the median diameter.

Printing and Evaluation

Elements were prepared using test images consisting of cyan, magenta, yellow, red, green and blue single color patches of approximately 3 by 3 centimeters in size with a Dmax density (100% dot coverage). Using an Epson 660 ink jet printer loaded with the above colored inks, the above test images were printed onto commercially available Epson Premium Glossy Paper, Cat. No SO41286 (The 60° gloss level of this receiver is about 34). The elements were allowed to dry for 24 hours at ambient temperature and humidity. Using the BYK-Gardner micro-TRI-glossmeter, gloss level from each patch was measured at 60° specular angle. Multiple measurements were carried out using three individual patches of the same color and the average values were used in the following tables.

TABLE 1

Gloss Adjustment By Pigment Particle Size

| Ink | Mean Pigment Particle Size at 50% (nm) | 60° Gloss |
| --- | --- | --- |
| Y1 | 40 | 109 |
| Y2 | 110 | 93 |
| Y3 | 130 | 73 |
| Y4 | 160 | 50 |
| Y5 | 57 | 96 |
| Y6 | 15 | 106 |
| M1 | 81 | 85 |
| M2 | 120 | 66 |
| C1 | 30 | 89 |
| C2 | 100 | 62 |
| C3 | 150 | 47 |
| C4 | 90 | 65 |
| C5 | 81 | 62 |

TABLE 2

Gloss Adjustment by Non-film forming Particles in ink

| Ink | Mean Pigment Particle Size at 50% (nm) | Non-film Forming Additive | Mean Adjustment Particle Size at 50% (nm) | 60° Gloss |
| --- | --- | --- | --- | --- |
| Y1 | 40 | — | — | 109 |
| Y1a | 40 | Nyacol ™ IJ 200 | 77 | 91 |
| Y1b | 40 | Snowtex ™ ST-ZL | 120 | 86 |
| Y1c | 40 | EF10611 | 150 | 79 |
| C1 | 30 | — | — | 89 |
| C1a | 30 | Nyacol ™ IJ200 | 77 | 78 |
| C1b | 30 | Snowtex ™ ST-ZL | 120 | 75 |
| C1c | 30 | EF10611 | 150 | 70 |

TABLE 3

Pigment Ink Set Selection

| Ink Set | Inks | | | 60 degree gloss on color patches | | | | | | | RGV % |
| --- | --- | --- | --- | --- | --- | --- | --- | --- | --- | --- | --- |
| | C | M | Y | C | M | Y | R | G | B | AG | |
| Comp-1 | C5 | M2 | Y6 | 62 | 66 | 106 | 73 | 73 | 64 | 74 | 15 |
| Comp-2 | C4 | M1 | Y5 | 65 | 85 | 96 | 78 | 50 | 46 | 70 | 23 |
| I-1 | C1 | M1 | Y2 | 82 | 81 | 93 | 84 | 92 | 76 | 85 | 6 |

TABLE 3-continued

Pigment Ink Set Selection

| Ink Set | Inks | | | 60 degree gloss on color patches | | | | | | | RGV % |
|---|---|---|---|---|---|---|---|---|---|---|---|
| | C | M | Y | C | M | Y | R | G | B | AG | |
| I-2 | C2 | M2 | Y3 | 62 | 66 | 73 | 70 | 70 | 72 | 69 | 5 |

C: Cyan, M: Magenta, Y: Yellow, R: Red, G: Green and B: Blue

Table 1 showed that the gloss levels of printed elements from the pigment based inks can be adjusted by using pigments of different particle sizes. The bigger the particle sizes, the lower the gloss value of the printed elements. Table 2 showed that the gloss levels of the printed elements of the pigment inks can be adjusted by adding a non-film forming particle additive. When using the same pigment dispersion, the bigger the size of the non-film forming additive, the lower the gloss of the printed element. Table 3 showed a comparison of Relative Gloss Variability (RGV %) calculated based on the gloss levels cyan, magenta, yellow, red, green and blue color patches. Compared with the comparative examples, the pigment ink set of the present invention gave much lower gloss variability.

The present description will be directed in particular to elements forming part of, or cooperating more directly with, apparatus and methods in accordance with the present invention. It is to be understood that elements not specifically shown or described may take various forms well known to those skilled in the art.

What is claimed is:

1. A method of selecting inks within an inkjet ink set for color printing comprises:
    a) providing at least two color inks, each ink comprising a carrier and a pigment;
    b) printing the above inks onto a receiver using test images consisting of single color patches of a Dmax density (100% dot coverage);
    c) measuring the gloss level of each patch at a predefined specular angle;
    d) calculating the Relative Gloss Variability (RGV) values of the ink set based on the definition in Equation A; and
    e) selecting inks for the color set such that the Relative Gloss Variability (RGV) among inks is less than 10% when 60° is used as the specular angle:

$$RGV(\%) = \frac{\sum_{I=1}^{N} |(Gloss(\text{Imaged Area})_I - AG)|}{AG} \Big/ N \quad \text{Equation (A)}$$

Where $$AG = \frac{\sum_{I=1}^{N} Gloss(\text{Imaged Area})_I}{N}$$

I is a variable which identifies a certain color patch used in the evaluation,
N is the total number of color patches used in the evaluation.

2. A method of selecting inks within an inkjet ink set for color printing comprises:
    a) providing at least two color inks, each ink comprising a carrier and a pigment;
    b) adjusting the sizes of the pigment particle of the inks to achieve the desired gloss;
    c) printing the above inks onto a receiver using test images; consisting of single color patches of a Dmax density (100% dot coverage);
    d) measuring the gloss level of each patch at a predefined specular angle; and
    e) selecting inks for the color set such that the Relative Gloss Variability (RGV) (Equation A) among inks is less than 10% when 60° is used as the specular angle:

$$RGV(\%) = \frac{\sum_{I=1}^{N} |(Gloss(\text{Imaged Area})_I - AG)|}{AG} \Big/ N \quad \text{Equation (A)}$$

Where $$AG = \frac{\sum_{I=1}^{N} Gloss(\text{Imaged Area})_I}{N}$$

I is a variable which identifies a certain color patch used in the evaluation,
N is the total number of color patches used in the evaluation.

3. A method of selecting inks within an inkjet ink set for color printing comprises:
    a) providing at least two color inks, each ink comprising a carrier and a pigment;
    b) adding into inks non-film forming particles with particle sizes selected to achieve the desired gloss;
    c) printing the above inks onto a receiver using test images; consisting of single color patches of a Dmax density (100% dot coverage);
    d) measuring the gloss level of each patch at a predefined specular angle; and
    e) selecting inks for the color set such that the Relative Gloss variability (RGV) (Equation A) among inks is less than 10% when 60° is used as the specular angle:

$$RGV(\%) = \frac{\sum_{I=1}^{N} |(Gloss(\text{Imaged Area})_I - AG)|}{AG} \Big/ N \quad \text{Equation (A)}$$

Where $$AG = \frac{\sum_{I=1}^{N} Gloss(\text{Imaged Area})_I}{N}$$

I is a variable which identifies a certain color patch used in the evaluation,
N is the total number of color patches used in the evaluation.

4. The method of claim 1, 2, or 3 wherein the Relative Gloss Variability (RGV) is less than 7%, when 60° is used as the specular angle.

5. The method of claim 1, 2, or 3 wherein the Relative Gloss Variability (RGV) is less than 5%, when 60° is used as the specular angle.

6. The method of claim 1, 2, or 3 wherein said at least two color inks are selected from the group consisting of Cyan, Yellow, Magenta, Black, White, Green, Violet and Orange.

7. The method of claim 1, 2, or 3 wherein said pigment comprises particles less than 0.5 micron in size.

8. The method of claim 1, 2, or 3 wherein said pigment represents 0.1 to 10 weight % of the ink composition.

9. The method of claim 1, 2, or 3 wherein the pigment is C.I. Pigment Yellow 155 or C.I. Pigment Yellow 74 or C.I. Pigment Blue 15:3 or bis(phthalocyanylalumino) tetraphenyldisiloxane. Or C.I. Pigment Red 122.

10. The method of claim 3 wherein the non-film forming particles range in size from 0.01 to 1 micron.

11. The method of claim 10 wherein the inorganic particles comprise silica, alumina, titinium dioxide, zirconia, clay, calcium carbonate, barium sulfate, zinc oxide, or combinations thereof.

12. The method of claim 11 wherein the organic polymeric particles comprises a polyurethane, a crylic, or a polyester, each with a Tg of greater than 60° C.

13. The method of claim 10 wherein the inorganic particles comprise silica.

14. The method of claim 3 wherein the non-film forming particles range in size from 0.03 to 0.5 micron.

15. The method of claim 3 wherein the non-film forming particles are inorganic particles.

16. The method of claim 3 wherein the said non-film forming particles are organic polymeric particles.

17. The method of claim 16 wherein the film forming polymer resin is a polyester, a polyurethane or a polyacrylic.

18. The method of claim 16 wherein the film forming polymer resin is a sulfonated polyester ionomer.

19. The method of claim 1, 2, or 3 further comprising a film forming polymer resin.

20. An ink jet printing method, comprising the steps of:
a) providing an ink jet printer that is responsive to digital data signals;
b) loading the printer with an ink-recording element;
c) loading the printer with an a color set comprising:
at least two color inks, each ink comprising a carrier and a pigment wherein the Relative Gloss Variability (RGV)(Equation A) among inks is less than 10% when 60° is used as the specular angle:

$$RGV(\%) = \frac{\sum_{I=1}^{N} |(\text{Gloss(Imaged Area)}_I - AG)|}{AG} \Big/ N \quad \text{Equation (A)}$$

Where $$AG = \frac{\sum_{I=1}^{N} \text{Gloss(Imaged Area)}_I}{N}$$

I is a variable which identifies a certain color patch used in the evaluation,
N is the total number of color patches used in the evaluation; and
d) printing on the ink-recording element using the ink jet ink in response to the digital data signals.

* * * * *